United States Patent [19]
Simon

[11] Patent Number: 5,924,456
[45] Date of Patent: Jul. 20, 1999

[54] TUBULAR SECTION MEMBER, IN PARTICULAR FOR USE AS A FLUID FLOW DUCT

[75] Inventor: Jean-Michel Simon, Clamart, France

[73] Assignee: Hutchinson, Paris, France

[21] Appl. No.: 08/569,105

[22] PCT Filed: Jun. 30, 1994

[86] PCT No.: PCT/FR94/00796

§ 371 Date: Feb. 5, 1996

§ 102(e) Date: Feb. 5, 1996

[87] PCT Pub. No.: WO95/01529

PCT Pub. Date: Jan. 12, 1995

[30] Foreign Application Priority Data

Jul. 1, 1993 [FR] France ................. 93 08047

[51] Int. Cl.⁶ ................................................. F16L 11/12
[52] U.S. Cl. ................. 138/122; 138/115; 138/117; 138/118; 138/129
[58] Field of Search ............. 138/115–117, 177, 138/118, 122, 129

[56] References Cited

U.S. PATENT DOCUMENTS

| | | | |
|---|---|---|---|
| 4,310,259 | 1/1982 | Ito et al. ........................ | 138/114 X |
| 4,795,439 | 1/1989 | Guest ............................. | 138/115 X |
| 4,906,496 | 3/1990 | Hosono et al. ................. | 138/114 X |
| 5,060,698 | 10/1991 | Anastassakis et al. ......... | 138/154 |

FOREIGN PATENT DOCUMENTS

| | | |
|---|---|---|
| 418 760 | 3/1991 | European Pat. Off. . |
| 964069 | 8/1950 | France . |
| 2658582 | 8/1991 | France . |
| 30 06 138 | 8/1981 | Germany . |
| 39 30 528 | 3/1991 | Germany . |
| 39 42 192 | 6/1991 | Germany . |
| 1317358 | 5/1973 | United Kingdom . |
| WO 92/19900 | 11/1992 | WIPO . |

Primary Examiner—Patrick Brinson
Attorney, Agent, or Firm—Alston & Bird LLP

[57] ABSTRACT

A tubular section member for use as a fluid flow hose or as an admission or exhaust silencer, characterized in that it includes internal partitions or ribs (12) which are corrugated in shape in cross-section, which are interconnected by an axial core (16) along the axis of the section member, and which are wound helically along said axial core (16).

20 Claims, 2 Drawing Sheets

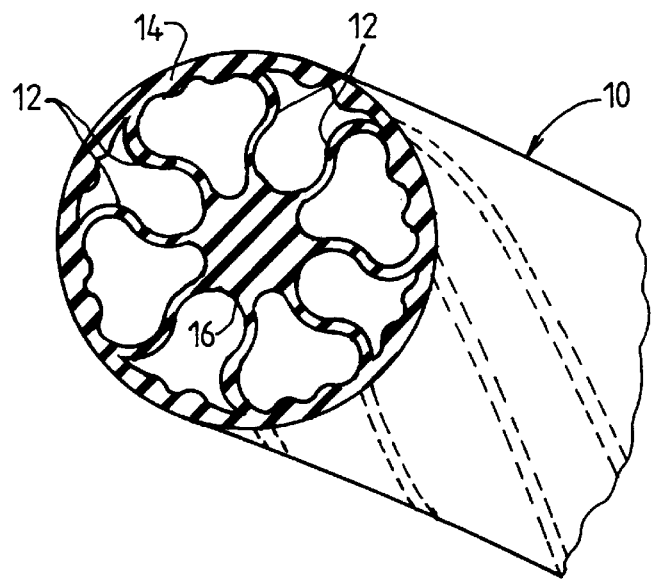
FIG.1
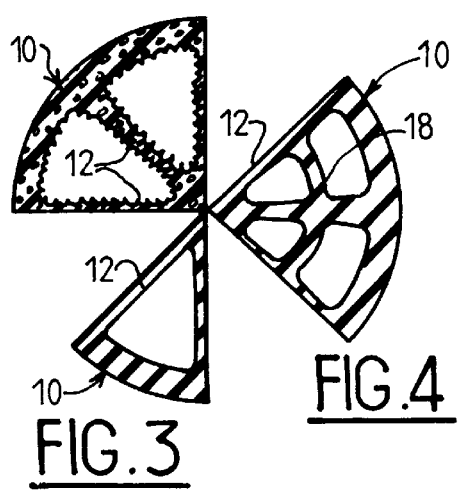
FIG.2
FIG.3
FIG.4
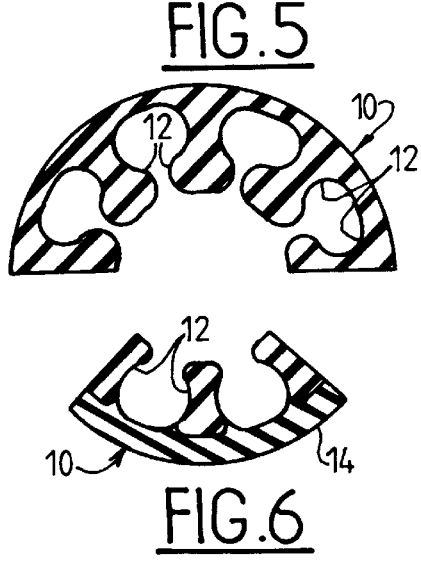
FIG.5
FIG.6
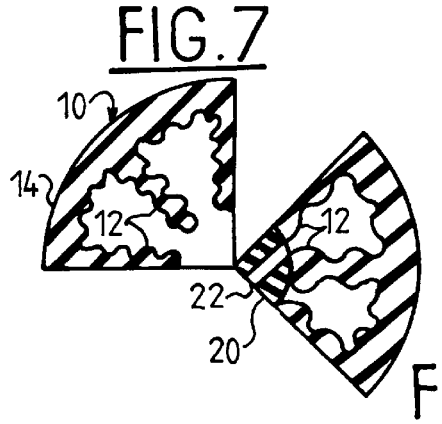
FIG.7
FIG.8

TUBULAR SECTION MEMBER, IN PARTICULAR FOR USE AS A FLUID FLOW DUCT

FIELD AND BACKGROUND OF THE INVENTION

The invention relates to tubular section members intended in particular for use as fluid flow ducts, or as admission or exhaust silencers in the car industry field, in building, or in the machines and engine industry, for example.

When it is necessary to attenuate transmission of sound in fluids flowing along tubes, it is general practice to use sound absorbing materials which are disposed inside the tubes and/or inside resonators tuned to the frequencies or frequency bands to be attenuated and which are connected in series or in parallel with the fluid flow tubes. Implementing such known means so that they are genuinely effective, turns out in general to be difficult and expensive.

In general, it is already known to form reinforced-wall tubes or pipes, by spiral-winding an extruded tubular section member, the turns touching one another and being bonded together (see for example U.S. Pat. No. 5,060,698 and EPO 0 418 760). It is also known, e.g. from patent DE 3 930 528, to form a pipe having a reinforced wall by spiral-winding an extruded tube, and then spiral-winding reinforcement between the turns of the tube. However, that known technique serves only to manufacture reinforced-wall tubes which are generally of large diameter, and which cannot serve as silencers.

A particular object of the invention is to provide a solution to these problems that is simple, effective, and cheap.

SUMMARY OF THE INVENTION

The invention provides a tubular section member equally suitable for use as a flexible fluid flow hose or as a silencer, e.g. for the admission or the exhaust of an engine, and which, on manufacture, presents intrinsic qualities of sound attenuation and of conserving initial shape on being curved or bent.

To this end, the invention provides a tubular section member, in particular for use as a fluid flow hose, characterized in that it also constitutes a silencer and includes means for preventing sound pressure waves from propagating directly along the inside of the section member, the said means comprising substantially radial internal partitions or ribs wound helically around the longitudinal axis of the section member.

Such a section member gives very good results when it is used as a silencer or as a fluid flow hose, the presence of helically wound internal radial ribs or partitions effectively attenuating sound, by preventing sound pressure waves from propagating directly.

In addition, the helically wound internal partitions or ribs limit radial collapse of the section member while it is being curved or bent, enabling the section member to retain a shape that is substantially constant along its entire length.

The section member of the invention may be made, at least in part, out of cellular or expanded material, so as to enhance attenuation of sound.

In a variant, the section member may be made out of two materials of different natures and/or hardnesses.

It is preferably made by extruding elastomer or thermoplastic materials. It may also be made by molding.

BRIEF DESCRIPTION OF THE DRAWINGS

The invention will be better understood and other characteristics, details, and advantages thereof will appear more clearly on reading the following description made by way of example and with reference to the accompanying drawings, in which:

FIG. 1 is a fragmentary diagrammatic section and perspective view of a tubular section member of the invention;

FIGS. 2 to 8 are diagrammatic fragmentary section views of variant embodiments of the section member.

DETAILED DESCRIPTION

Figure 9:
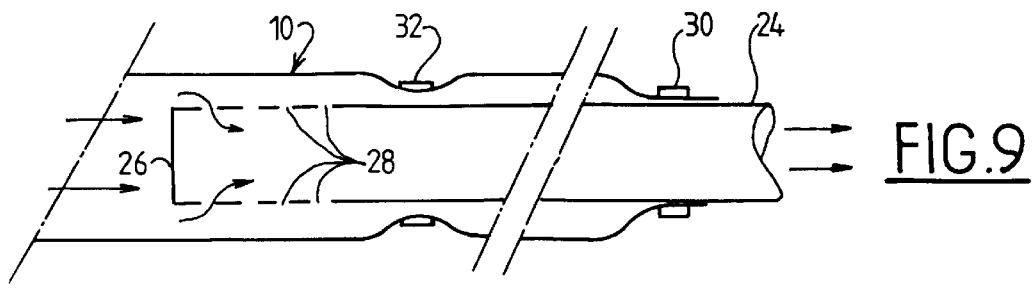
FIGS. 9 to 13 are diagrams showing various ways in which the section member of the invention can be used.

Reference is made initially to FIG. 1 in which reference 10 designates a tubular section member of the invention which is generally in the form of a cylinder of circular cross-section and which can be made by extruding a flexible or semi-rigid elastomer, for example.

The section member 10 includes a plurality of internal partitions or ribs 12 which are substantially radial, extending between its peripheral wall 14 and an axial internal core 16.

As can be seen clearly in FIG. 1, these internal partitions or ribs 12 have a cross-section of corrugated shape and in addition they are wound helically in non-touching turns around the longitudinal axis or axial core 16 of the section member, defining between them parallel internal channels which are separated from one another by the partitions 12 and which wind helically around the axis of the section member.

When this section member is used as a silencer or for fluid flow, a sound pressure wave conveyed by the fluid is reflected a multitude of times in the helical channels and it cannot propagate directly from one end of the section member to the other. In addition, the non-plane shapes of the internal ribs or partitions 12 accentuate diffraction of the soundwave.

The fluid acquires a moment of inertia on entering the section member, which moment of inertia is then conserved in the fluid flow. The additional headloss is due mainly to the increase in the friction area in contact with the fluid, and to the shape of the inlets and outlets of the section member. As a result, headlosses in the fluid are not made unacceptably worse by the channels of the section member being wound helically.

Finally, the section member 10 may, overall, be made out of a material that absorbs sound, e.g. a cellular or expanded material.

Variant embodiments are shown by way of example in FIGS. 2 to 8.

In the embodiment of FIG. 2, the section member 10 is made entirely out of expanded or cellular material and its internal partitions 12 are rectilinear in cross-section.

In the embodiment of FIG. 3, the partitions 12 are likewise rectilinear in cross-section, but the section member is made overall out of compact material.

In the embodiment of FIG. 4, the section member 10 is made out of compact material and its internal partitions 12, which are rectilinear in cross-section, for example, are interconnected by at least one annular partition 18, thereby doubling the number of compartments formed inside the section member 10.

In the embodiment of FIG. 5, the section member 10 is made of compact material, it does not have the axial core 16 of the embodiment of FIG. 1, and the internal partitions or ribs 12 extend into the inside of the section member over substantially half the inside radius thereof.

In addition, the radial sides of the ribs 12 in cross-section are of concave curved shape, with their free ends or tips being of convex curved shape.

In this case, the channels defined by the internal partitions or ribs 12 inside the section member 10 are in communication with one another.

By enlarging the tips of the internal partitions or ribs 12, it is possible to almost close the internal channels of the section member while allowing them to communicate with the axial cavity via narrow slits. In this case, it is possible to cause the fluid to flow either inside the internal channels, with the axial cavity forming a resonant cavity, or else inside the axial cavity, with the internal channels forming resonance cavities.

In the embodiment of FIG. 6, the internal ribs 12 of the section member 10 are of more or less the same shape as in the embodiment of FIG. 5, but they are made of a material that is different from the material of the peripheral wall 14 of the section member, e.g. a cellular or expanded material when it is desired to enhance sound attenuation, or a material that is stiffer when it is desired to make the section member easier to position.

In the embodiment of FIG. 7, the internal ribs 12 extend over about ⅔ to ¾ of the inside radius of the section member 10 from its peripheral surface 14, and in cross-section they have an outline with multiple corrugations of small amplitude.

The section member 10 then has no axial core.

In the embodiment of FIG. 8, the internal partitions or ribs 12 have the same shape as in the embodiment of FIG. 7, however their free ends bear against an internal core 20 which is of cylindrical shape, which is fitted inside the section member, and which is optionally made of a material that is different from that of the section member 10. The inner core 20 may include passages or bores 22 establishing communication between internal channels of the section member 10.

Advantageously, the section member of the invention may be made by continuous extrusion in a single operation without interruption using a rotary extrusion head disposed inside an extrusion die. Rotation of the head may be motor-driven or else free, with the extrusion head then being rotated by the flow of extruded material which is itself caused to rotate about the axis of the extrusion die by means of guide vanes or blades.

In a variant, the section member may be made by molding.

The section member may be made of one or more thermoplastic materials or of one or more elastomer materials.

Figure 10:
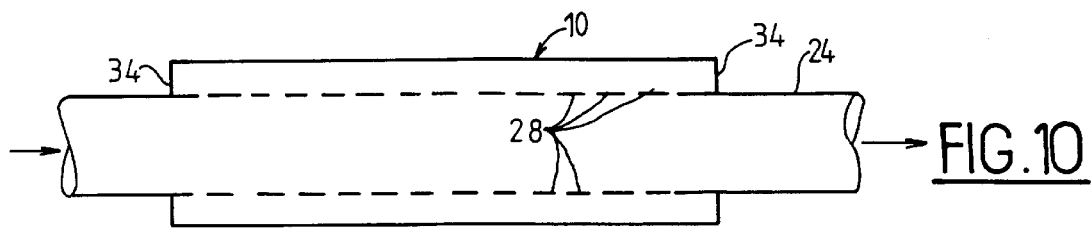

Reference is now made to FIGS. 9 and 10 which are diagrams showing several different ways in which the section member of the invention can be used.

In FIG. 9, a section member 10 of the invention, e.g. of the type shown in FIG. 5, is mounted around a tube 24 whose end 26 engaged inside the section member 10 is closed axially, the tube 24 including radial orifices or perforations 28 in the vicinity of said closed end 26.

The righthand end (in the drawing) of the section member 10 is closed, e.g. by being clamped onto the peripheral surface of the tube 24 by means of an annular part 30. Another annular part 32, of the same type as the annular part 30, may be used for tightening an intermediate portion of the section member 10 onto the tube 24 without closing off completely the internal channels of the section member, so as to establish a set of necks.

The system of FIG. 9 forms a resonator type silencer serving to attenuate certain unwanted sound frequencies, particularly in the low frequency range. Fluid penetrates into the system from the lefthand end (in the drawing) of the section member 10 and then passes into the tube 24 via its orifices or perforations 28. The portion of the section member 10 extending between the annular parts 30 and 32 constitutes a resonant cavity tuned to the frequency which is to be attenuated.

In a variant, it is possible to mount a plurality of annular parts 32 for narrowing the section member 10 to form a succession of sets of necks, or it is possible to close the internal channels of the section member at different locations so as to create different resonant cavities, thereby attenuating a plurality of sound frequencies.

In the embodiment of FIG. 10, a section member 10 of the invention is mounted around a fluid flow tube 24 and it is closed at both axial ends 34. The portion of the inner tube 24 lying inside the section member 10 includes series of orifices or perforations 28 opening out into the section member 10 whose internal channels constitute resonance cavities.

Figure 11:
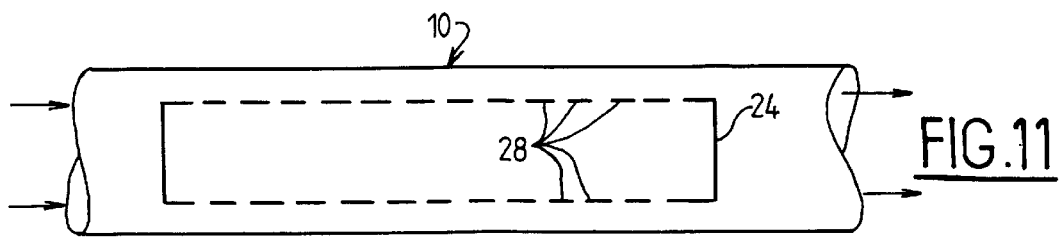

In the embodiment of FIG. 11, the structure is the inverse of the structure shown in FIG. 10: it is the section member 10 which is open at both ends and which serves for fluid flow, while the tube 24 is closed at its ends and forms a resonance cavity.

Figure 12:
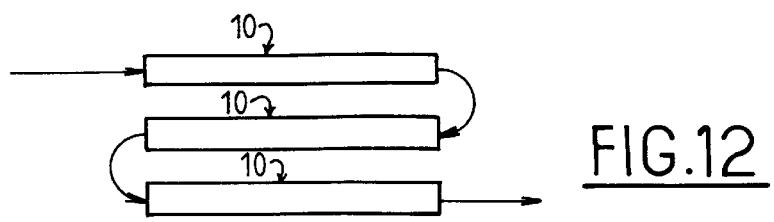

In the embodiment of FIG. 12, a plurality of section members 10 of the invention are juxtaposed or placed in side-by-side alignment to constitute a compact assembly and they are interconnected in series so as to form a silencer of short axial length.

Figure 13:
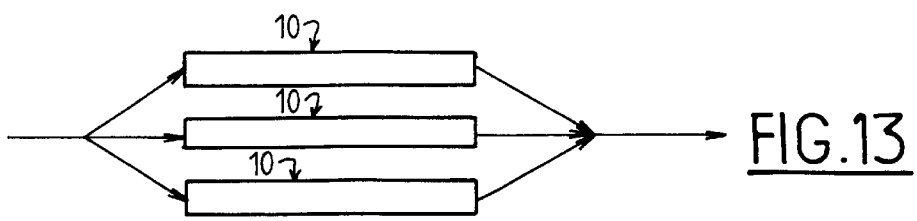

In the embodiment of FIG. 13, the section members 10 of the invention are juxtaposed or in side-by-side alignment to form a compact assembly, and they are fed in parallel by a flow of fluid.

The section member of the invention can be used as a hose for fluid flow in a motor vehicle, as an admission or exhaust silencer on a heat engine or on a pneumatic machine, and as a ventilation duct in buildings, structures, ships, etc.

I claim:

1. A tubular section member for use as a fluid flow hose, comprising a silencer including means for preventing sound pressure waves from propagating directly along the inside of the section member, said means comprising substantially radial internal partitions or ribs wound helically around the longitudinal axis of the section member, said partitions or ribs extending radially over at least half of the inside radius of the section member.

2. A section member according to claim 1, wherein said internal partitions or ribs have a radial extent that is less than the inside radius of the section member.

3. A section member according to claim 1, wherein said internal partitions or ribs are interconnected along the longitudinal axis of the section member and define parallel channels that are wound helically around the axis of the section member.

4. A section member according to claim 1, wherein said internal partitions or ribs have a cross-section that is corrugated in shape.

5. A section member according to claim 1, wherein said internal partitions or ribs have a cross-section that is rectilinear in shape.

6. A section member according to claim 1, wherein said internal partitions or ribs are interconnected along the axis of the section member by a solid portion forming an axial internal core.

7. A section member according to claim 6, wherein the axial internal core is a separate part.

8. A section member according to claim 1, wherein said internal partitions or ribs are interconnected by at least one annular partition cooperating therewith to define a plurality of parallel channels helically wound around the axis of the section member.

9. A section member according to claim 1, wherein said member is made at least in part out of expanded or cellular material.

10. A section member according to claim 1, wherein said member is made by extrusion.

11. A section member according to claim 1, wherein said member is made of thermoplastic or elastomer materials.

12. A section member according to claim 1, wherein said internal partitions or ribs define internal parallel channels, and wherein said member is closed at at least one end, and constitutes a resonance cavity around a fluid flow tube which includes orifices communicating with the internal parallel channels of the section member.

13. A section member according to claim 12, wherein its internal section is locally reduced by at least one annular part clamped on the section member.

14. A section member according to claim 1, wherein said member contains a perforated length of tube closed at its ends and forming a resonance cavity.

15. A section member according to claim 1, wherein said member is made at least in part out of at least two different materials.

16. A tubular section member for use as a fluid flow hose, comprising a silencer including means for preventing sound pressure waves from propagating directly along the inside of the section member, said means comprising substantially radial internal partitions or ribs wound helically around the longitudinal axis of the section member, wherein said internal partitions or ribs are interconnected along the axis of the section member by a solid portion forming an axial internal core and said axial internal core is a separate part.

17. A tubular section member for use as a fluid flow hose, comprising a silencer including means for preventing sound pressure waves from propagating directly along the inside of the section member, said means comprising substantially radial internal partitions or ribs wound helically around the longitudinal axis of the section member, and wherein said internal partitions or ribs are interconnected by at least one annular partition cooperating therewith to define a plurality of parallel channels helically wound around the axis of the section member.

18. A tubular section member for use as a fluid flow hose, comprising a silencer including means for preventing sound pressure waves from propagating directly along the inside of the section member, said means comprising substantially radial internal partitions or ribs wound helically around the longitudinal axis of the section member, wherein said internal partitions or ribs define internal parallel channels, and said member is closed at at least one end, and constitutes a resonance cavity around a fluid flow tube which includes orifices communicating with the internal parallel channels of the section member.

19. A section member according to claim 18, wherein its internal section is locally reduced by at least one annular part clamped on the section member.

20. A tubular section member for use as a fluid flow hose, comprising a silencer including means for preventing sound pressure waves from propagating directly along the inside of the section member, said means comprising substantially radial internal partitions or ribs wound helically around the longitudinal axis of the section member, wherein said member contains a perforated length of tube closed at its ends and forming a resonance cavity.

* * * * *